Patented Dec. 7, 1926.

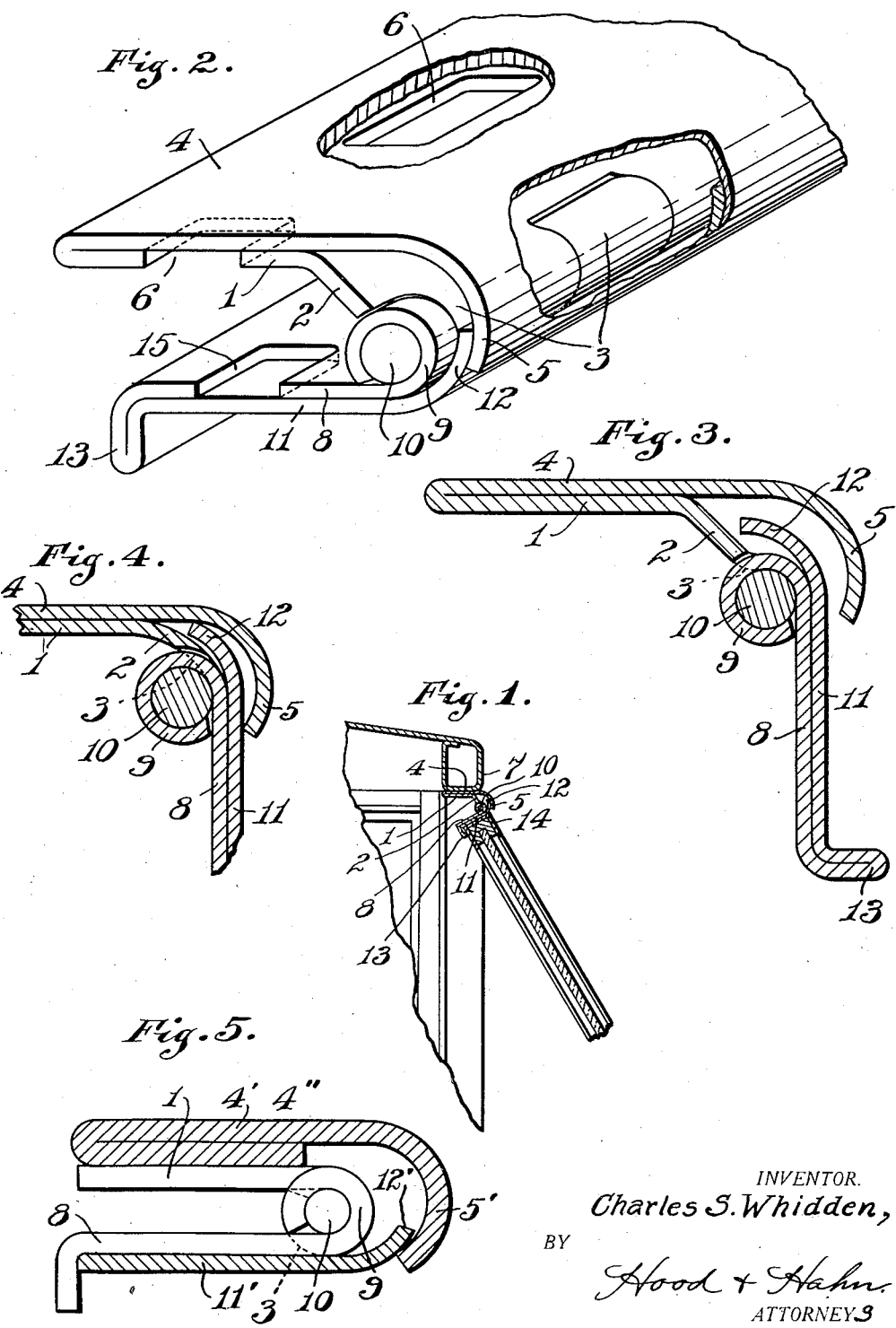

1,609,590

UNITED STATES PATENT OFFICE.

CHARLES S. WHIDDEN, OF INDIANAPOLIS, INDIANA.

SHEET-METAL HINGE JOINT.

Application filed March 19, 1926. Serial No. 95,900.

My invention relates to improvements in hinge supports for the windshields of automobiles and the like, one of the objects being to provide a hinge support which, while permitting the windshield to be opened and closed will at the same time prevent the ingress of rain at the hinge joint either when the windshield is open or closed.

For the purpose of disclosing my invention I have illustrated one embodiment thereof in the accompanying drawings in which Fig. 1 is a sectional view of a part of the front end of an automobile and the upper portion of a windshield showing my improved hinge support therefor;

Fig. 2 is a perspective view of my windshield support;

Fig. 3 is a sectional view thereof, and

Fig. 4 is a sectional view of a modification thereof, and

Fig. 5 a sectional view of another modification.

In the embodiment illustrated the upper or supporting member comprises a bottom plate 1 the forward end of which extends forwardly and downwardly as at 2 and is provided with the curved edge fingers 3 forming one member of a piano hinge joint. The plate 1 is preferably bent back upon itself to form a top plate 4 the forward edge of which projects beyond the hinge fingers 3 and is downwardly curved over these fingers as at 5. The bottom plate 1 at suitable intervals is provided with openings 6 to permit the application directly to the top plate of one electrode of a spot welding machine whereby the top plate 4 may be spot welded to the under face of the top bar 7 of the windshield opening in an automobile frame.

The second hinge member comprises the inner plate 8 having fingers 9 at its forward end curved to form a co-operating hinge member arranged to co-operate with the members 3 and receive the hinge rod 10. This plate 8 like the plate 1 is doubled back upon itself to form an outer plate 11 the forward end of which is curved as at 12 to coincide with the arc of the end 5, being arranged when the plates 11 and 4 lie parallel with one another to be overlapped by the curved end 5. The inner end of the bottom member is provided with an angularly bent lip 13 which provides a positioning strip for the top of the windshield frame 14. The inner plate 8 like the plate 1 is provided with openings 15 to permit of the application directly to the plate 11 of a spot welding tool whereby the plate 11 may be spot welded directly to the top bar of the windshield frame 14.

The structure illustrated is adapted for that type of windshield which is hingedly supported at its top and adapted to be opened outwardly at its lower edge. The hinge support is so positioned that the curved overlapping sections 12 and 5 extend forwardly and with the windshield in closed position the plates 4 and 11 are substantially in parallelism as illustrated in Fig. 2. In this position it will be noted that, due to the fact that the curved end of the plate 4 overlaps the curved end 12, the hinge joint is thoroughly protected against the ingress of water through said joint which may beat in during the rain and which may run down from the top of the automobile. When the windshield is open the inner end of the bottom hinge member swings downwardly toward a right angle position and during such movement the curved end 12 of the bottom plate 11 moves inwardly between the curved edge 5 of the plate 4 and the forward end 2 of the bottom plate 1 so that the windshield may be freely swung on its hinge joint to any open position desired and at the same time the curved edge 5 will overhang the hinge joint and prevent water from getting into the hinge joint. In Fig. 3 the parts are illustrated with the windshield moved to its extreme open position.

In Fig. 4 I have illustrated a modified structure wherein the forward extension 2 of the bottom plate more closely hugs the top plate 4 so that the curved edge 5 of the top plate will more closely fit over the plate 11 when the windshield is in its open position.

In Fig. 5 the plates 1 and 8 have their hinge eyes and the joint is guarded by a plate 11' welded to plate 8 and provided with a spring edge 12' and by a plate 4' provided with a spring edge 5' overlapping the edge 12' and spaced from the eyes 9 and 3, so as to give space for movement of the edge 12, by having the opposite edge of plate 4, as indicated at 4", doubled under and welded to plate 1.

While the parts 12 and 5, or 12' and 5', are not in substantial parallelism, they should nevertheless vary from absolute parallelism by an amount such that, when the parts are swung to a position where the windshield will be closed, as indicated in Figs. 2 and 5, edge 12 (or 12') will come into positive contact with the edge 5 (or 5'), the parts being sufficiently yielding so as to insure, throughout the life of the apparatus, a close and absolutely weather-proof contact.

I claim:—

1. A weather-proof hinge comprising sheet metal elements having interdigitated hinge eyes, and two overlapping sheet metal elements, one carried by each of the first-mentioned elements, the said overlapping elements completely enclosing the hinge joint on the weather side.

2. A weather-proof hinge comprising sheet metal elements having interdigitated hinge eyes, and two overlapping sheet metal elements, one carried by each of the first-mentioned elements, the said overlapping elements completely enclosing the hinge joint on the weather side and engaging each other with a yielding contact when the hinge is in closed position.

3. A hinge comprising a sheet metal strip doubled upon itself with hinge eyes formed in one edge and the other edge formed into a curved guard overlying the hinge eyes; a second sheet metal strip doubled upon itself and having hinge eyes formed in one edge and capable of interdigitation with the hinge eyes of the first-mentioned strip, and having its other edge formed into a guard overlying the hinge eyes and spaced therefrom, the two guard edges overlapping each other, and a hinge pin extending through the hinge eyes.

4. A hinge comprising a sheet metal strip doubled upon itself with hinge eyes formed in one edge and the other edge formed into a curved guard overlying the hinge eyes; a second sheet metal strip doubled upon itself and having hinge eyes formed in one edge and capable of interdigitation with the hinge eyes of the first-mentioned strip, and having its other edge formed into a guard overlying the hinge eyes and spaced therefrom, the two guard edges overlapping each other and one capable of a laterally yielding contact with the other, and a hinge pin extending through the hinge eyes.

5. A hinge comprising a sheet metal strip having hinge eyes formed along one edge thereof, a guard strip carried by said first-mentioned strip and having one edge formed into a curved guard overlying and spaced from the hinge eyes, a second hinge strip having hinge eyes formed along one edge and capable of interdigitation with the hinge eyes of the first mentioned strip, and a guard strip attached to said second-mentioned hinge strip and having one edge formed into a curved guard overlying the hinge eyes and overlapping the first-mentioned guard edge between said guard edge and the hinge eyes.

6. A hinge comprising a sheet metal strip having hinge eyes formed along one edge thereof, a guard strip carried by said first-mentioned strip and having one edge formed into a curved guard overlying and spaced from the hinge eyes, a second hinge strip having hinge eyes formed along one edge and capable of interdigitation with the hinge eyes of the first-mentioned strip, and a guard strip attached to said second-mentioned hinge strip and having one edge formed into a curved guard overlying the hinge eyes and overlapping the first mentioned guard edge between said guard edge and the hinge eyes, one of said guard edges being laterally yieldable whereby the two guard edges will yieldingly contact when the hinge is in closed position.

In witness whereof, I have hereunto set my hand at Indianapolis, Indiana, this 8th day of December, A. D. one thousand nine hundred and twenty five.

CHARLES S. WHIDDEN.